United States Patent
Kim et al.

(10) Patent No.: US 11,968,693 B2
(45) Date of Patent: *Apr. 23, 2024

(54) TRANSMISSION METHOD AND APPARATUS FOR MIMO SYSTEM

(71) Applicant: Samsung Electronics Co., Ltd., Suwon-si (KR)

(72) Inventors: Jonghwan Kim, Suwon-si (KR); Seijoon Shim, Suwon-si (KR); Jongho Oh, Suwon-si (KR); Kilsik Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,585

(22) Filed: Jul. 10, 2023

(65) Prior Publication Data

US 2023/0354356 A1 Nov. 2, 2023

Related U.S. Application Data

(63) Continuation of application No. 17/197,841, filed on Mar. 10, 2021, now Pat. No. 11,751,210.

(30) Foreign Application Priority Data

Sep. 17, 2020 (KR) .................. 10-2020-0120102
Feb. 2, 2021 (KR) .................. 10-2021-0014497

(51) Int. Cl.
*H04W 72/23* (2023.01)
*H04B 7/0413* (2017.01)
(Continued)

(52) U.S. Cl.
CPC .......... *H04W 72/23* (2023.01); *H04B 7/0413* (2013.01); *H04W 8/22* (2013.01); *H04W 8/26* (2013.01); *H04W 72/51* (2023.01)

(58) Field of Classification Search
CPC .......... H04W 8/26; H04W 8/22; H04B 7/0413
See application file for complete search history.

(56) References Cited

U.S. PATENT DOCUMENTS 8,014,265 B2  9/2011  Sarkar et al.
9,048,892 B2  6/2015  Walton et al.
(Continued)

FOREIGN PATENT DOCUMENTS

CN  110913409 A  3/2020
CN  111565418 A  8/2020
(Continued)

OTHER PUBLICATIONS

ORAN-WG4.CUS.0-v02.00, O-RAN Fronthaul Working Group, Control, User and Synchronization Plane Specification, Aug. 2, 2019.

(Continued)

*Primary Examiner* — Sulaiman Nooristany
(74) *Attorney, Agent, or Firm* — Jefferson IP Law, LLP

(57) ABSTRACT

A communication technique for convergence between an IoT technology and a $5^{th}$ generation (5G) communication system for supporting a higher data transmission rate beyond a $4^{th}$ generation (4G) system, and a system thereof is provided. The method includes intelligence services (for example, smart homes, smart buildings, smart cities, smart cars or connected cars, healthcare, digital education, retail businesses, security and safety related services, and the like.) On the basis of a 5G communication technology and an IoT-related technology. A method includes determining a scheduling-related parameter for at least one user, and transmitting scheduling information indicating the scheduling-related parameter to a radio unit (RU), wherein the scheduling information includes a first section extension field including information relating to a user equipment identifier (ueID) related to the at least one user, and a second section extension field including information relating to a number of ueIDs corresponding to each user.

20 Claims, 20 Drawing Sheets

(51) Int. Cl.
*H04W 8/22* (2009.01)
*H04W 8/26* (2009.01)
*H04W 72/51* (2023.01)

(56) References Cited

U.S. PATENT DOCUMENTS

| | | | |
|---|---|---|---|
| 10,492,160 | B2 | 11/2019 | Ruffini et al. |
| 2018/0132200 | A1 | 5/2018 | Gheorghiu et al. |
| 2019/0289497 | A1 | 9/2019 | Rajagopal |
| 2021/0120531 | A1* | 4/2021 | Jeon ............... H04W 72/046 |
| 2021/0126760 | A1* | 4/2021 | Lee ................ H04B 7/0617 |

FOREIGN PATENT DOCUMENTS

| | | |
|---|---|---|
| EP | 3 442 307 A1 | 2/2019 |
| EP | 3 468 284 A1 | 4/2019 |
| KR | 10-1501847 B1 | 4/2015 |
| KR | 10-2020-0033706 A | 3/2020 |
| KR | 10-2083273 B1 | 3/2020 |
| WO | 2020/040723 A1 | 2/2020 |
| WO | 2020/060296 A1 | 3/2020 |

OTHER PUBLICATIONS

NTT Docomo, Technical Journal, vol. 21, No. 1, Jul. 2019, Retrieved from the internet: <URL: https://www.nttdocomo.co.jp/english/corporate/technology/rd/technical_journal/bn/vol21_1> pp. 43, 51-52; and figures 3, 7, 11, Jun. 1, 2021.
International Search Report dated Jun. 16, 2021, issued in International Application No. PCT/KR2021/002945.
O-RAN Alliance; O-RAN Fronthaul Working Group Control, User and Synchronization Plane Specification; O-RAN. WG4.CUS.0-v03.00; Technical Specification; XP009530675; Apr. 1, 2020.
European Search Report dated Oct. 24, 2023; European Appln. No. 21869495.8-1216 / 4165786 PCT/KR2021002945.
U.S. Notice of Allowance dated Sep. 27, 2023; U.S. Appl. No. 18/349,561.

* cited by examiner

FIG. 5

| Section Type : any | | | | | | | | # of bytes | |
|---|---|---|---|---|---|---|---|---|---|
| 0 [mbs] | 1 | 2 | 3 | 4 | 5 | 6 | 7 [lbs] | | |
| ecpriVersion (500) | | | ecpriReserved (510) | | | | ecpriConcatenation (520) | 1 | Octet 1 |
| ecpriMessage (530) | | | | | | | | 1 | Octet 2 |
| ecpriPayload (540) | | | | | | | | 2 | Octet 3 |
| ecpriRtcid / ecpriPcid (550) | | | | | | | | 2 | Octet 5 |
| ecpriSeqid (560) | | | | | | | | 2 | Octet 7 |

FIG. 7

| 0 (mbs) | 1 | 2 | 3 | 4 | 5 | 6 | 7 (lbs) | # of bytes | |
|---|---|---|---|---|---|---|---|---|---|
| transport header ||||||||| 8 | Octet 1 |
| dataDirection (702) | payloadVersion ||| filterIndex (704) |||| 1 | Octet 9 |
| subframeId (708) || frameId (706) |||||| 1 | Octet 10 |
| slotId ||| startSymbol ||| slotId (710) || 1 | Octet 11 |
| numberOfsections (714) ||||||||  1 | Octet 12 |
| sectionType = 5 (716) ||||||||  1 | Octet 13 |
| udCompHdr (718) ||||||||  1 | Octet 14 |
| reserved ||||||||  1 | Octet 15 |
| sectionId (722) ||||||||  1 | Octet 16 |
| sectionId || rb (724) | symInc | startPrbc (726) |||| 1 | Octet 17 |
| startPrbc ||||||||  1 | Octet 18 |
| numPrbc (728) ||||||||  1 | Octet 19 |
| reMask[11:4] (730) ||||||||  1 | Octet 20 |
| reMask[3:0] |||| numSymbol (732) |||| 1 | Octet 21 |
| ef (734) | ueId[14:8] |||||||  1 | Octet 22 |
| ueId[7:0] ||||||||  1 | Octet 23 |
| ueId[14:8] ||||||||  1 | Octet 24 |
| section extensions as indicated by "ef" ||||||||  var | Octet 25 |

| 0 [mbs] | 1 | 2 | 3 | 4 | 5 | 6 | 7 [lbs] | #of bytes | |
|---|---|---|---|---|---|---|---|---|---|
| transport header ||||||||| 8 | Octet 1 |
| data Direction | payloadVersion ||| filterIndex |||| 1 | Octet 9 |
| frameId ||||||||| 1 | Octet 10 |
| subframeId |||| slotId ||||| 1 | Octet 11 |
| slotId ||| startSymbolId |||||| 1 | Octet 12 |
| numberOfsections ||||||||| 1 | Octet 13 |
| sectionType = 6 ||||||||| 1 | Octet 14 |
| numberOfUEs ||||||||| 1 | Octet 15 |
| reserved ||||||||| 1 | Octet 16 |
| ef | ueId[14:8] |||||||| 1 | Octet 17 |
| ueId[7:0] ||||||||| 1 | Octet 18 |
| regularizationFactor ||||||||| 2 | Octet 19 |
| reserved |||| rb | sybInc | startPrbc ||| 1 | Octet 21 |
| startPrbc ||||||||| 1 | Octet 22 |
| numPrbc ||||||||| 1 | Octet 23 |
| ciIsample (first PRB, first antenna) ||||||||| 1 | Octet 24 |
| ciQsample (first PRB, first antenna) ||||||||| var | |
| ... ||||||||| | |
| ciIsample (first PRB, first antenna) ||||||||| | |
| ciQsample (first PRB, first antenna) ||||||||| | |
| ... ||||||||| | |
| ciIsample (last PRB, last antenna) ||||||||| | |
| ciQsample (last PRB, last antenna) ||||||||| | |
| section extensions as indicated by "ef" ||||||||| | |
| ... ||||||||| | |

| 0 (mbs) | 1 | 2 | 3 | 4 | 5 | 6 | 7 (lbs) |
|---|---|---|---|---|---|---|---|
| ef | New extType ||||||||
| extLen ||||||||
| numUser ||||||||
| numUeID of first user |||| numLayer of first user ||||
| reserved | 1st ueID[14:8] |||||||
| 1st ueID[7:0] ||||||||
| ... ||||||||
| reserved | numUeID-th ueID[14:8] |||||||
| numUeID-th ueID[7:0] ||||||||
| ... ||||||||
| numUeID of last user |||| numLayer of last user ||||
| reserved | 1st ueID[14:8] |||||||
| 1st ueID[7:0] ||||||||
| ... ||||||||
| reserved | numUeID-th ueID[14:8] |||||||
| numUeID-th ueID[7:0] ||||||||
| filler to ensure 4-byte boundary ||||||||

FIG. 12

| 0 [mbs] | 1 | 2 | 3 | 4 | 5 | 6 | 7 [lbs] |
|---|---|---|---|---|---|---|---|
| ef | extType = 0x0y | | | | | | |
| extLen (1 word) | | | | | | | |
| BeamGroupType=10b(or11b) | numPortc(number of user-1) | | | | | | |
| reserved | 2nd ueID[14:8] | | | | | | |
| 2nd ueID[7:0] | | | | | | | |
| ... | | | | | | | |
| advBeamFlag=1 | (numPortc+1)-th ueID[14:8] | | | | | | |
| (numPortc+1)-th ueID[7:0] | | | | | | | |
| reserved | 1st ueID[14:8] (for first user) | | | | | | |
| 1st ueID[7:0] (for first user) | | | | | | | |
| numUeID of 1st user | numLayer of 1st user | | | | | | |
| Remaining ueIDs of 1st user | | | | | | | |
| ... | | | | | | | |
| reserved | (numPortc+1)-th ueID[14:8] (for(numPortc+1)-th user) | | | | | | |
| (numPortc+1)-th ueID[14:8] (for(numPortc+1)-th user) | | | | | | | |
| numUeID of (numPortc+1)-th user | numLayer of (numPortc+1)-th user | | | | | | |
| Remaining ueIDs (numPortc+1)-th user | | | | | | | |

| 0 [mbs] | 1 | 2 | 3 | 4 | 5 | 6 | 7 [lbs] |
|---|---|---|---|---|---|---|---|
| ef | extType = 0x0y | | | | | | |
| extLen (1 word) | | | | | | | |
| BeamGroupType=10b | numPortc (=number of scheduled layers-1) | | | | | | |
| reserved | 2nd ueID[14:8] | | | | | | |
| 2nd ueID[7:0] | | | | | | | |
| ... | | | | | | | |
| advBeamFlag=1 | (numPortc+1)-th ueID[14:8] | | | | | | |
| (numPortc+1)-th ueID[7:0] | | | | | | | |
| numUser | | | | | | | |
| reserved | Representative ueID of 1st user[14:8] | | | | | | |
| Representative ueID of 1st user[7:0] | | | | | | | |
| numUeID of 1st user | | | | numLayer of 1st user | | | |
| Remaining ueIDs of 1st user except for ueIDs in section extension | | | | | | | |
| ... | | | | | | | |
| reserved | Representative ueID of last user[14:8] | | | | | | |
| Representative ueID of last user[7:0] | | | | | | | |
| numUeID of last user | | | | numLayer of last user | | | |
| Remaining ueIDs of last user except for ueIDs in section extension | | | | | | | |

| 0 (mbs) | 1 | 2 | 3 | 4 | 5 | 6 | 7 (lbs) |
|---|---|---|---|---|---|---|---|
| ef | | extType = 0x0y ||||||
| extLen (1 word) |||||||||
| BeamGroupType=10b || numPortc (=number of scheduled layers-1) ||||||
| reserved | 2nd ueID[14:8] |||||||
| 2nd ueID[7:0] |||||||||
| ... |||||||||
| reserved | (numPortc+1)-th ueID[14:8] |||||||
| (numPortc+1)-th ueID[7:0] |||||||||

| ef | New extType |
|---|---|
| extLen (1 word) ||
| numUeID of 1st user | numUeID of 2nd user |
| ... ||
| ... | numUeID of last user |
| filler to ensure 4-byte boundary ||

| 0 (mbs) | 1 | 2 | 3 | 4 | 5 | 6 | 7 (lbs) |
|---|---|---|---|---|---|---|---|
| ef=1 | | extType = 0x0y | | | | | |
| extLen (1 word) | | | | | | | |
| BeamGroupType=10b | | numPortc =4 | | | | | |
| reserved | | 2nd ueID = 0 (ueID [14:8]) | | | | | |
| 2nd ueID = 0 (ueID [7:0]) | | | | | | | |
| reserved | | 3rd ueID = 8 (ueID [14:8]) | | | | | |
| 3rd ueID = 8 (ueID [7:0]) | | | | | | | |
| reserved | | 4th ueID = 8 (ueID [14:8]) | | | | | |
| 4th ueID = 8 (ueID [7:0]) | | | | | | | |
| reserved | | 5th ueID = 8 (ueID [14:8]) | | | | | |
| 5th ueID = 8 (ueID [7:0]) | | | | | | | |
| filler to ensure 4-byte boundary | | | | | | | |

| ef | New extType |
|---|---|
| extLen (1 word) | |
| numUeID of 1st user = 4 | numUeID of 2nd user = 8 |
| filler to ensure 4-byte boundary | |

TRANSMISSION METHOD AND APPARATUS FOR MIMO SYSTEM

CROSS-REFERENCE TO RELATED APPLICATION(S)

This application is a continuation application of prior application Ser. No. 17/197,841, filed on Mar. 10, 2021, and is based on and claims priority under 35 U.S.C. 119(a) of a Korean patent application number 10-2020-0120102 filed on Sep. 17, 2020, in the Korean Intellectual Property Office, and of a Korean patent application number 10-2021-0014497 filed on Feb. 2, 2021, in the Korean Intellectual Property Office, the disclosure of each of which is incorporated by reference herein in its entirety.

BACKGROUND

1. Field

The disclosure relates to a wireless communication system. More particularly, the disclosure relates to a method and an apparatus for transmitting, receiving, and processing a control message.

2. Description of the Related Art

To meet the demand for wireless data traffic having increased since deployment of $4^{th}$ generation (4G) communication systems, efforts have been made to develop an improved $5^{th}$ generation 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

A base station for providing mobile communication services has an integral form in which a data processor or a digital unit (or a distributed unit (DU)) and a wireless transceiver or a radio unit (or a remote unit (RU)) of the base station are installed in a cell site. However, the base station having the same form fails to satisfy needs of mobile communication providers who want to construct multiple cell sites due to an increase in the user number and traffic, and thus a structure of a centralized radio access network (RAN) (C-RAN or a cloud RAN) has been introduced. The C-RAN has a structure in which DUs are intensively arranged in one physical place and only an RU is left in a cell site enabling transmission ore reception of a wireless signal to or from the actual terminal, wherein the DU and the RU can be connected by using an optical cable or a coaxial cable. In addition, as the RU and the DU are split, there is a need for an interface standard for communication therebetween, and the standard, such as a common public radio interface (CPRI) is currently used between the RU and the DU. Furthermore, the same base station structure has been standardized in the 3rd-generation partnership project (3GPP), and research has been conducted on an open radio access network (O-RAN) which is an open network standard applicable to the 5G system.

In order to satisfy demands for wireless data traffic, research on a 5th-generation communication system (hereinafter, interchangeably used with a 5G system or a new radio or a next radio (NR) system) has been carried out. It is predicated that users can be provided with services at a high data rate through the 5G system, and the Internet of things and wireless communication services having various purposes, such as a service requiring high reliability for special purposes, can be provided.

A multiple-input multiple-output system is a technology enabling a transceiver to perform communication using multiple antennas, and it has been theoretically proven that the capacity of the MIMO system increases in proportion to the number of antennas. Thanks to the advantages of increasing traffic in a relatively simpler way, the MIMO system has been standardized to be used for various communication and broadcasting systems. In addition, the massive MIMO system, which recently has drawn attention, allows beamforming using multiple antennas and effectively prevents interference between multi-users, thereby taking its position as a core technology of 5G mobile communication.

For efficient management of data transmission in terms of the massive MIMO system, a function split of a transmission unit into a digital unit (DU) and a radio unit (RU) has been used. In the function split structure, the DU performs digital signal processing and RU performs digital-to-analog conversion and analog signal transmission. However, recently, in order to satisfy various services and system requirements, an interface for each function split structure type is defined in a standard, such as the O-RAN, and efforts have been made through publication of the standard to discuss a required interface according to function split into the DU and the RU.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a transmission method of a multi-user multiple-input multiple-output (MIMO) system including channel feedback. In general, a transmission end may apply precoding allowing provision of a beam gain to a desired user while compensating an interference effect on the multi-user, which occurs at a downlink, by using channel information received from a reception end. The disclosure proposes a multi-user precoding system and defines an interface between the digital unit (DU) and the radio unit (RU), required for actual implementation of the system.

Additional aspects will be set forth in part in the description which follows and, in part, will be apparent from the description, or may be learned by practice of the presented embodiments.

In accordance with an aspect of the disclosure, a method of a DU of a base station is provided. The method of the DU of a base station includes determining a scheduling-related parameter for at least one user, and transmitting scheduling information indicating the scheduling-related parameter to an RU, wherein the scheduling information includes a first section extension field including information relating to a user equipment identifier (ueID) related to the at least one user, and a second section extension field including information relating to a number of ueIDs corresponding to each user.

In accordance with another aspect of the disclosure, the scheduling-related parameter is provided. The scheduling-related parameter includes at least one of at least one ueID corresponding to each user, the number of ueIDs corresponding to each user, a number of the at least one user to be scheduled, and the number of layers of each user.

According to an embodiment of the disclosure, for each of the at least one user, the first section extension field repeatedly includes as many identical ueIDs as the number of layers of each user.

According to an embodiment of the disclosure, the first section extension field may include as many different ueIDs as the number of the at least one user to be scheduled through the scheduling information.

According to an embodiment of the disclosure, the at least one ueID corresponding to each user may have as many consecutive values as the number of ueIDs corresponding to each user.

In accordance with another aspect of the disclosure, a method of an RU of a base station is provided. The method of the RU of a base station includes receiving, from a DU, scheduling information indicating a scheduling-related parameter for at least one user, and acquiring the scheduling-related parameter by using the scheduling information, wherein the scheduling information includes a first section extension field including information relating to a ueID related to the at least one user, and a second section extension field including information relating to a ueID user related to each user.

In accordance with another aspect of the disclosure, a digital unit device of a base station is provided. The digital unit device of a base station includes a connector configured to transmit or receive a signal to or from an RU, and at least one processor configured to determine a scheduling-related parameter for at least one user, and transmit scheduling information indicating the scheduling-related parameter to the RU, wherein the scheduling information includes a first section extension field including information relating to a ueID related to the at least one user, and a second section extension field including information relating to the number of ueIDs corresponding to each user.

In accordance with another aspect of the disclosure, an RU device of a base station is provided. The RU device of a base station includes a connector configured to transmit or receive a signal to or from a DU, and at least one processor configured to receive, from the DU, scheduling information indicating a scheduling-related parameter for at least one user, and acquire the scheduling-related parameter by using the scheduling information, wherein the scheduling information includes a first section extension field including information relating to a ueID related to the at least one user, and a second section extension field including information relating to the number of ueIDs related to each user.

In accordance with an aspect of the disclosure, a transmission method of a multi-user MIMO system is provided. The transmission method of a multi-user MIMO system includes channel feedback. Specifically, the disclosure proposes a multi-user precoding system and defines an interface between the DU and the RU, required for actual implementation of the system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates a format of an enhanced common public radio interface (CPRI) (eCPRI) header according to an embodiment of the disclosure;

FIG. 7 illustrates a section type-5 C-plane message format according to an embodiment of the disclosure;

FIG. 9 illustrates a section type-6 C-plane message format according to an embodiment of the disclosure;

FIG. 11 illustrates a second operation of a message format for transferring scheduling information according to an embodiment of the disclosure;

FIG. 12 illustrates a third operation of a message format for transferring scheduling information according to an embodiment of the disclosure;

FIG. 13 illustrates a fourth operation of a message format for transferring scheduling information according to an embodiment of the disclosure;

FIG. 15B illustrates a message format for transferring scheduling information according to an embodiment of the disclosure;

Throughout the drawings, like reference numerals will be understood to refer to like parts, components, and structures.

DETAILED DESCRIPTION

Figure 1:
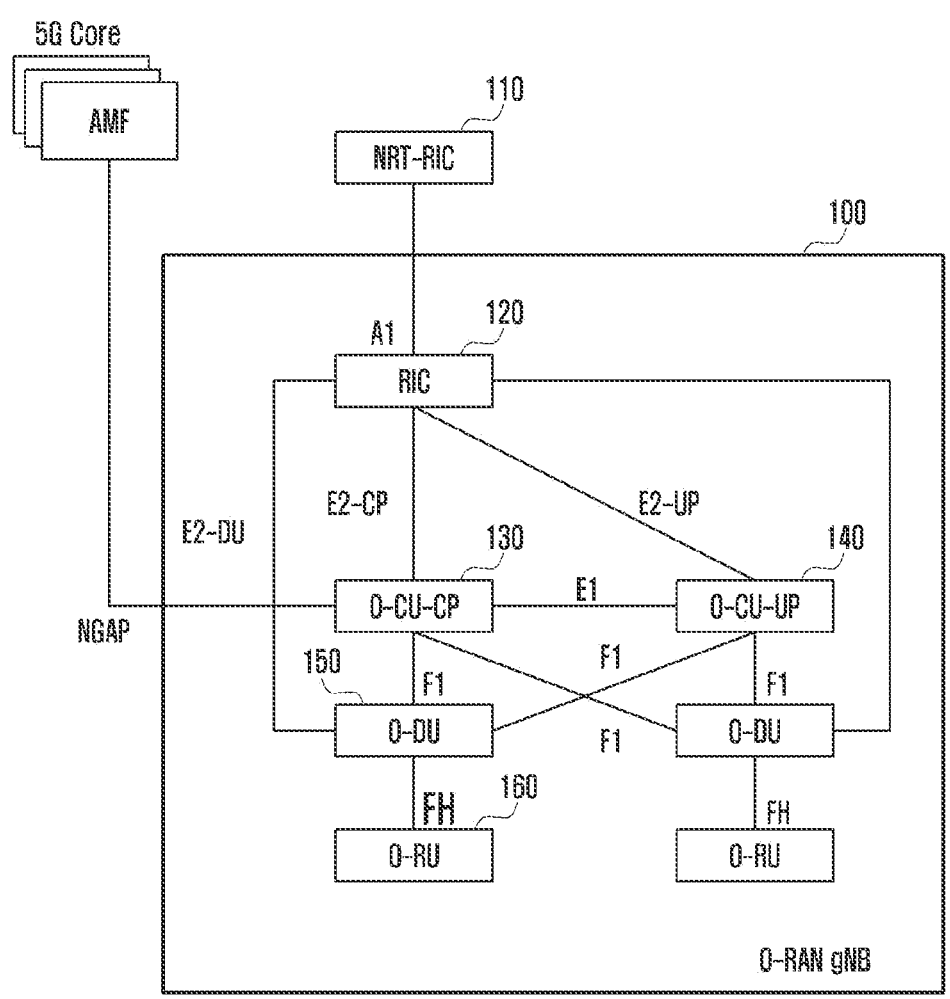
FIG. 1 illustrates an open radio access network (O-RAN) network system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding the disclosure. Accordingly, it should be apparent to those skilled in the art that the following description of various embodiments of the disclosure provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operation for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, in the disclosure, an uplink (UL) refers to a radio link through which a terminal transmits data or a control signal to a base station, and a downlink (DL) refers to a radio link through which the base station transmits data or a control signal to the terminal. In addition, the base station is an entity that allocates a resource to the terminal, and may be one of an eNode B, a Node B, a base station (BS), a generation Node B (gNB), a radio access unit, a base station controller, and a node on a network. The terminal may include a user equipment (UE), a mobile station (MS), a cellular phone, a smartphone, a computer, or a multimedia system capable of performing a communication function.

Due to commercialization of a 5th-generation communication system to satisfy demands for radio data traffic, services having a high data rate are provided to users through the 5G system along with a 4G system, and it is predicted that the Internet of things and wireless communication services having various purposes, such as services that require high reliability for a specific purpose can be provided.

The open radio access network (O-RAN) alliance established by service providers and equipment provision companies to support a current network system including the 4G communication system, the 5G communication system, and the like mixed therein defines, based on the 3GPP standard, a new network element (NE) and an interface standard, and thus an O-RAN structure has been introduced. The O-RAN newly defines an RU, a DU, a central unit-control plane (CU-CP), and a central unit-user plane (CU-UP), which are the 3GPP NEs, as an O-RU, an O-DU, an O-CU-CP, and an O-CU-UP, respectively (collectively referred to as an "O-RAN base station"), and additionally standardizes an RAN intelligent controller (RIC) and a non-real-time RAN intelligent controller (NRT-RIC). The O-DU and the RIC may be connected through the Ethernet, the O-CU-CP and the RIC may be connected through the Ethernet, and the O-CU-UP and the RIC may be connected through the Ethernet. Further, interface standards for communication between the O-DU and the RIC, between the O-CU-CP and the RIC, and between the O-CU-UP and the RIC are needed, and the standards, such as an E2-DU, an E2-CU-CP, and an E2-CU-UP can be currently used between the RIC and the O-DU, the O-CU-CP, and the O-CU-UP, respectively. Hereinafter, the RU, the DU, the CU-CP, and the CU-UP may be interchangeably used with the O-RU, the O-DU, the O-CU-CP, and the O-CU-UP, respectively, unless specifically stated otherwise.

FIG. 1 illustrates an O-RAN network system according to an embodiment of the disclosure.

Referring to FIG. 1, the O-RAN network is a standard that logically separates eNB and gNB functions of the 4G and 5G systems, and an NRT-RIC 110, an RIC 120 in an O-RAN gNB 100, an O-CU-CP 130, an O-CU-UP 140, an O-DU 150, and an O-RU 160 are defined in the O-RAN standard.

The NRT-RIC 110 is a logical node allowing non-real-time control rather than real-time control, optimization of RAN elements and resources, model training, update, and the like. The newly defined RIC 120 is a logical node that intensively arranges servers in one physical place and allows near-real-time control and optimization of RAN elements and resources by using data collected from the O-DU 150, the O-CU-CP 130, the O-CU-UP 140, and the like through an E2 interface. The O-CU including the O-CU-CP 130 and the O-CU-UP 140 is a logical node providing functions of a radio resource control (RRC), a service data adaptation protocol (SDAP), and a packet data convergence protocol (PDCP). The O-CU-CP 130 is a logical node providing functions of the control plane part of the RRC and the PDCP, and the O-CU-UP 140 is a logical node providing functions of the user plane part of the SDAP and the PDCP. The O-CU-CP 130 is connected to an access and mobility management function (AMF) included in a 5G network (5G core) through a next-generation application protocol (NGAP) interface. The O-DU 150 is a logical node providing functions of an RLC, a MAC, and a higher physical (high-PHY) layer, and the O-RU 160 connected to the O-DU 150 is a logical node providing a function of a lower physical (low-PHY) layer and RF processing. In FIG. 1, it is illustrated that a single logical node is connected, but multiple logical nodes can be connected. For example, multiple O-RUs 160 can be connected to a single O-DU 150, or multiple O-DUs 150 can be connected to a single O-CU-UP 140.

The disclosure is not limited to the terms of the above-described nodes, and the configuration of the disclosure can be applied to the case of a logical node or an entity performing the above-described functions. In addition, the logical nodes can be located in the same location or different locations, and the function thereof can be provided by the same physical device (for example, a processor, a controller, etc.) or by different physical devices. For example, one physical device can provide the above-described at least one function of the logical node through virtualization. Hereinafter, the O-DU can be interchangeable used with the DU, and the O-RU can be interchangeable used with the RU.

Figure 2:
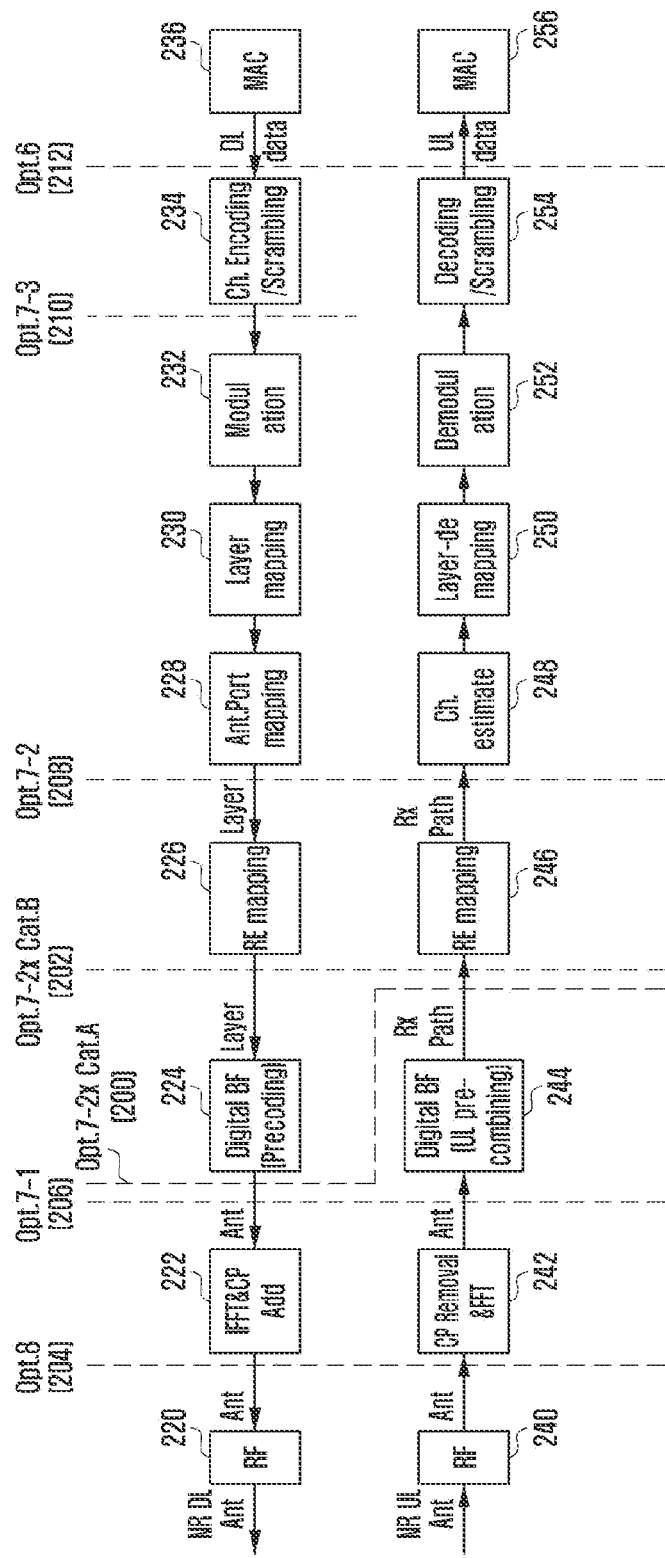
FIG. 2 illustrates a low-layer function split by using a radio unit (RU) and a digital unit (DU) according to an embodiment of the disclosure.

FIG. 2 illustrates a low-layer function split by using an RU and a DU according to an embodiment of the disclosure.

Referring to FIG. 2, the RU and the DU may be connected to each other through a fronthaul (FH). Here, the RU and the DU may share and perform the function of each physical layer.

In the 4G or 5G communication system, in a case of a downlink physical layer, downlink data is received in a MAC layer 236, channel coding and scrambling for the received data is performed (operation 234), modulation for the scrambled data is performed (operation 232), and then layer-mapping of a modulation symbol is performed (operation 230). After the modulation symbol mapped to each layer is mapped to each antenna port (operation 228), and is mapped to the corresponding resource element (RE) (a resource allocation unit including a subcarrier and a symbol) (operation 226), digital beamforming (interchangeably used with "precoding") is performed (operation 224), an inverse fast Fourier transform (IFFT) is performed and a cyclic prefix (CP) is added (operation 222) after transformation to a time-domain signal, and then the signal is carried by the carrier frequency in an RF 220 and is transmitted to the terminal through an antenna. In addition, in the 4G or 5G communication system, in a case of an uplink physical layer, a signal of a carrier frequency received through an antenna is converted into a baseband signal in an RF 240, the converted signal is transformed into a frequency-domain signal through CP removal and an FFT (operation 242), and the applied digital beamforming is applied in a reverse manner to perform uplink signal combining (operation 244), the signal is de-mapped in the RE to which the uplink signal is mapped (operation 246) to perform channel estimation (operation 248), layer-demapping is performed (operation 250) to demodulate an arranged modulation symbol (operation 252), and a bit sequence obtained as the result of the demodulation is de-scrambled and decoded so as to obtain information bits (operation 254). Later, the information bits are transferred to the MAC layer 256.

In this case, there are various options in the low-layer function split. For example, referring to FIG. 2, option 6 212, option 7-3 210, option 7-2 208, option 7-2x category B 202, option 7-2x category A 200, option 7-1 206, and option 8 204. In this case, a function located in the right side with reference to one option is performed by the DU, and a function located in the left side is performed by the RU. For example, a CPRI of the LTE system corresponds to option 8, and in a case of a downlink, a signal that have performed all physical-layer processes illustrated in FIG. 2 is transmitted by the DU to the RU through the FH, and the RU performs only a process of converting the received signal into an analog signal and transmitting the same to the terminal. However, the more functions performed by the DU, the bandwidth of the required fronthaul becomes greater, and thus option 7-2x category B 202 and option 7-2x category A 200 can be supported in the O-RAN.

Specifically, option 7-2x category A 200 corresponds to an O-RU capability category not capable of processing precoding of data received from an O-DU by an O-RU, and option 7-2x category B 202 corresponds to an O-RU capability category capable of processing precoding of data received from the O-DU by the O-RU. The O-DU is to support a category A O-RU for eight or less transmission streams. For example, the O-DU can support precoding of up to eight transmission streams. In this case, when option 7-2x category B 202 is applied, the O-DU transmits, to the O-RU, beamforming information and information on a modulation symbol to which layer-mapping has been already performed, and the O-RU applies beamforming to the modulation symbol, converts the modulation symbol to an analog signal, and then transmits the same to the terminal through an antenna.

There are four types of information to be transmitted from the O-DU to the O-RU in option 7-2x Information transmitted in the management plane (M-plane) is transmitted in non-real time along both directions of the DL and the UL, and is information for an initial setup or reset (or reconfiguration) between the O-DU and the O-RU. Information transmitted in the synchronization plane (S-plane) is transmitted in real time, and is information for synchronization or getting timing between the O-DU and the O-RU. Information transmitted in the control plane (C-plane) is transmitted in real time along a DL direction, and is information for transmitting a scheduling and/or beamforming command to the O-RU by the O-DU. Information transmitted in the user plane (U-plane) is transmitted in real time along both directions of the DL and the UL, and DL frequency-domain IQ data (including a synchronization signal block (SSB) and a reference signal), UL frequency-domain IQ data (including a reference signal, such as a sounding reference signal), and frequency-domain IQ data for a physical random-access channel (PRACH) are transmitted in the U-plane. The term "information" or "data" can be interchangeably used with a "message".

Next, information transmitted between the O-RU and the O-DU is described in more detail.

Figure 3:
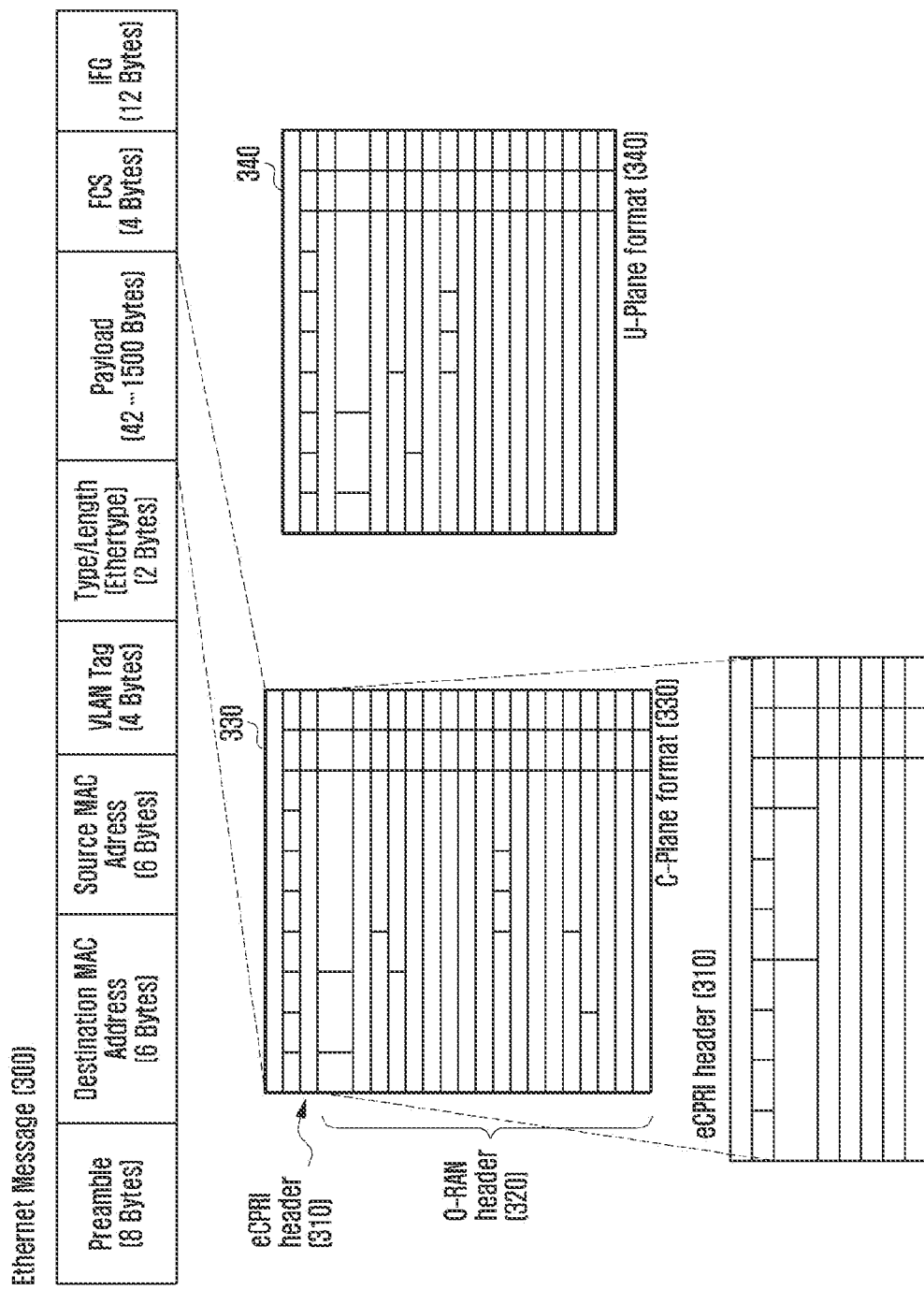
FIG. 3 illustrates a format of a message transmitted between an RU and a DU according to an embodiment of the disclosure.

FIG. 3 illustrates a format of a message transmitted between an O-RU and an O-DU according to an embodiment of the disclosure.

Referring to FIG. 3, the O-RU and the O-DU are connected to each other through the Ethernet, and the specification of an Ethernet message is as shown in reference numeral 300. A payload of the Ethernet message includes a message having a format according to each plane, for example, the format of the C-plane is as shown in reference numeral 330. The C-plane format 330 includes an enhanced CPRI (eCPRI) header 310 and an O-RAN header 320. The payload may include information of a U-plane format 340 or information of a format according to another plane.

Figure 4:
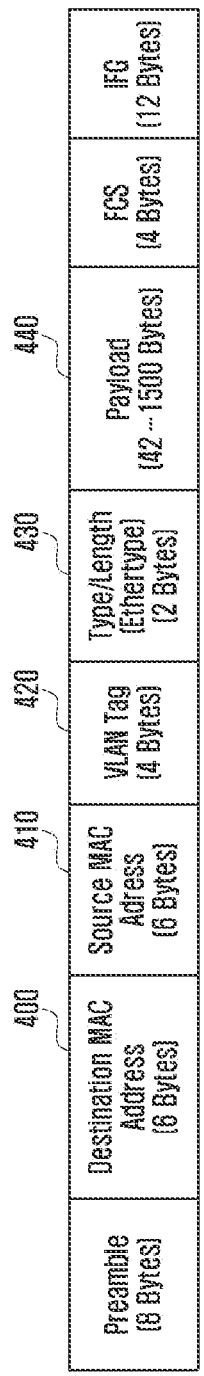
FIG. 4 illustrates an Ethernet message according to an embodiment of the disclosure.

FIG. 4 illustrates an Ethernet message according to an embodiment of the disclosure.

Referring to FIG. 4, in the Ethernet message header, a destination MAC address 400 indicates a public address of an RU or a massive MIMO unit (MMU) in case of the DL, and indicates a public address of a particular port of a channel card of the DU in a case of the UL, wherein the channel card may perform an operation of a medium access control (MAC) layer responsible for scheduling, an operation of a higher physical layer (high-PHY), and an operation of converting a data format according to an interface between the RU and the DU. A source MAC address 410 indicates a public address of an RU or an MMU in a case of the UL, and indicates a public address of a particular port of a channel card of the DU in a case of the DL.

A virtual LAN (VLAN) tag 420 has 4 bytes, and allows a C-plane, a U-plane, and a S-plane message to be mapped to different VLAN tags and managed. A tag protocol identifier (TPID) included in the VLAN tag has 16 bits and is configured with a value of 0x8100 to identify a frame as an IEEE 802.1Q tag frame. This field is located in the same location as an Ethertype/length field 430 in an untagged frame, and is thus used to distinguish the untagged frame from a normal frame. Tag control information included in the VLAN tag has also 16 bits and includes the following three fields. A priority code point (PCP) has 3 bits and indicates a priority of a frame. A drop eligible indicator (DEI) has 1 bit, is used separately or in conjunction with the PCP, and indicates frames eligible to be dropped in the presence of traffic congestion. A VLAN identifier (VID) has 12 bits and is a field indicating a frame to which the VLAN belongs. All other values except for reserved values of 0x000 and 0xFFF are used as VLAN identifiers, allowing up to 4,094 VLANs. The reserved value 0x000 indicates that the frame does not belong to any VLANs, and in this case, the 802.1Q tag specifies only a priority and is referred to as a priority tag. A type/length (Ethertype) 430 is for the eCPRI and is configured to have a fixed value of 0xAEFE.

As shown in FIG. 3, the payload 440 may include a plane format-specific message including an eCPRI header. Each field or the content of the information described above in association with FIG. 4 does not necessarily include all fields, and some fields can be omitted and/or other fields may be added to perform the disclosure.

FIG. 5 illustrates a format of an eCPRI header according to an embodiment of the disclosure. The eCPRI header is a transport header and is located in the front side of the Ethernet payload (440 of FIG. 4).

Referring to FIG. 5, the eCPRI header has 8 bytes, wherein the ecpriVersion 500 has 4 bits and a fixed value of 0001b is used, the ecpriReserved 510 has 3 bits and a fixed value of 0000b is used, the ecpriConcatenation 520 has 1 bit and a fixed value of 0b is used, and the ecpriMessage 530 has 1 byte and indicates a message type. A value of 0000 0000b (0x0) is used for the U-plane, a value of 0000 0010b (0x2) is used for the C-plane, and a value of 0000 0101b (0x5) is used for eCPRI delay measurement.

The ecpriPayload 540 has 2 bytes and the size of the payload is indicated in byte, and the ecpriRtcid/ecpriPcid 550 has 2 bytes and the following configuration of a bit number for each field is possible according to the M-plane configuration. The CU_Port_ID (x bits) included in the ecpriRtcid/ecpriPcid 550 is configured to distinguish a channel card of the RU, and also distinguish a modem. In this case, 2 bits may be used for distinguishing the channel card, and 2 bits may be used for distinguishing the modem. The BandSector_ID (y bits) may indicate the corresponding cell or sector. The CC_ID (z bits) may indicate the corresponding component carrier. The RU_Port_ID (w bits) may be configured to distinguish a layer, an antenna, etc.

The ecpriSeqid 560 has 2 bytes, and a sequency ID and subsequence ID are separately managed by using a sequence ID managed for each ecpriRtcid/ecpriPcid 550. Radio-transport-level fragmentation is possible by using the subsequence ID. Each field or the content of the information described above in association with FIG. 5 does not necessarily include all fields, and some fields can be omitted and/or other fields may be added to perform the disclosure.

Next, a C-plane message is described in more detail.

Figure 6:
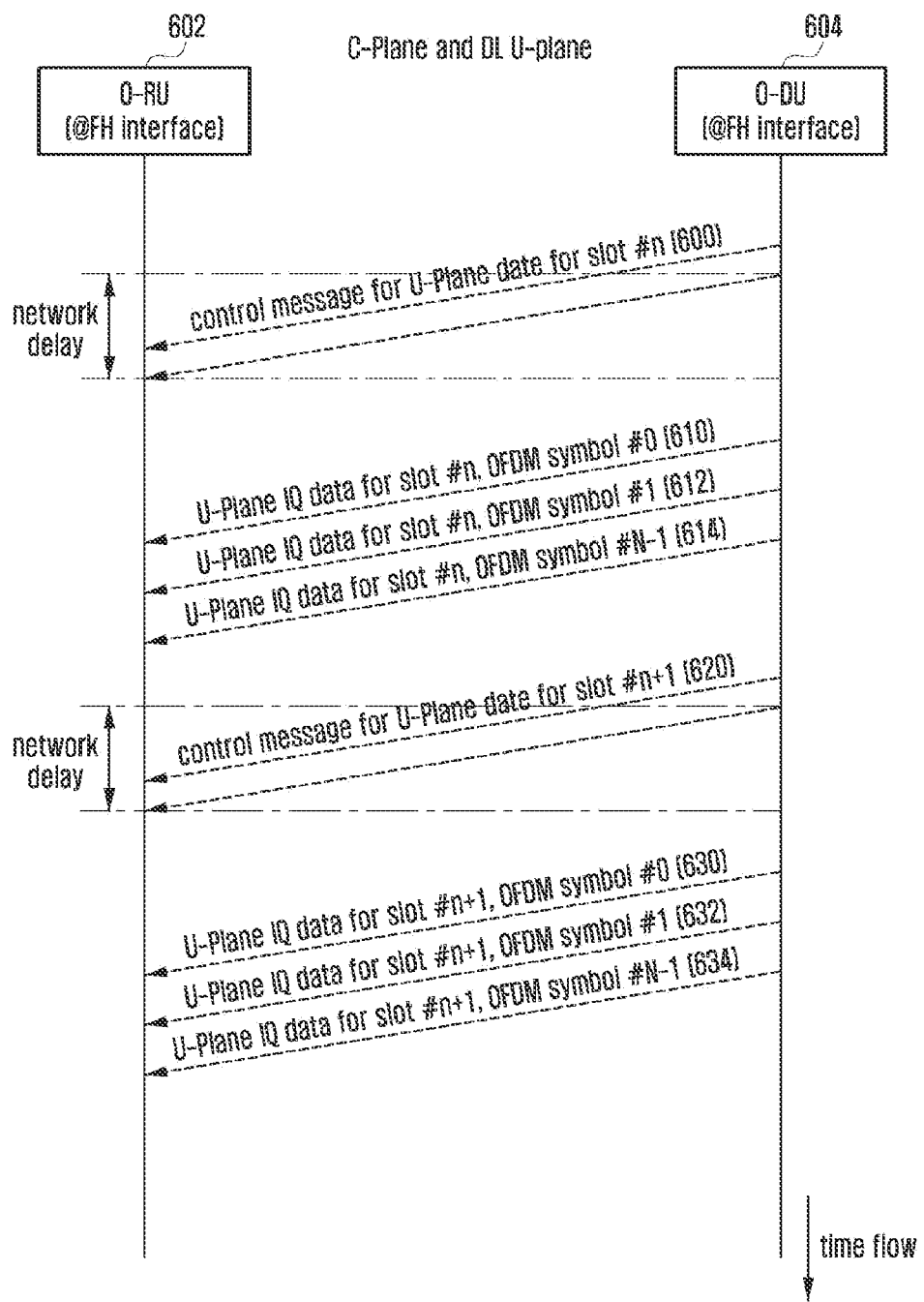
FIG. 6 illustrates a flow of transmitting a control message or data through a C-plane or a U-plane message according to an embodiment of the disclosure.

FIG. 6 illustrates a flow of transmitting a control message or data through a C-plane or a U-plane message according to an embodiment of the disclosure.

Referring to FIG. 6, an O-DU 604 transmits, to an O-RU 602, a control plane (C-plane) message for U-plane data of slot #n (operation 600). The C-plane message corresponds to eCPRI message type 2, and allocation information relating to a section and beamforming information corresponding to each section are transferred by using six sectionType messages. The section means an area to which consecutive RB resources having the same beam pattern in one slot are allocated, and U-plane data can be transferred for each section. In general, a single section may have a rectangular shape including 12 REs (or subcarriers) (that is, one resource block (RB)) to 273 RBs along a frequency axis, and 1 symbol to 14 symbols along a time axis. This may include consecutive or inconsecutive allocation. When a beam applied within 12 REs (1 RB) changes, one section can be distinguished by multiple REMasks having different bit patterns.

The following six sections types can be supported.
sectionType=0: This indicates a DL idle/guard period, and is used for transmission blanking for power saving.
sectionType=1: This is used for beamforming index or weight mapping to an RE of a DL or UL channel, and corresponds to a beamforming scheme supported as mandatory in the O-RAN.
sectionType=3: This is used for beamforming index or weight mapping to an RE of a PRACH and mixed-numerology channel.
sectionType=5: This is used for transferring UE scheduling information to enable the RU to calculate a beamforming weight in real time, and corresponds to a beamforming scheme supported as optional in the O-RAN.
sectionType=6: This is used for periodical transferring of UE channel information to enable the RU to calculate a beamforming weight in real time, and corresponds to a beamforming scheme supported as optional in the O-RAN.
sectionType=7: This is used to support a licensed assisted access (LAA).

The O-DU 604 having transmitted the C-plane message transmits IQ data for each OFDM symbol of slot #n by using a U-plane message (operations 610, 612, and 614). The U-plane message transfers IQ data (and a reference signal and an SSB) relating to a user and PRACH IQ data by using eCPRI message type 0. The U-plane data includes two types of data formats. An IQ format and compression scheme for DL/UL user data and static data format are fixed, and the IQ format and the compression scheme are configured by using an M-plane message at the initial time point of the RU. An IQ format and compression scheme for DL/UL user data and dynamic data format may dynamically change, and the IQ format and the compression scheme are configured by using a DL U-plane message and a UL C-plane message.

Later, the O-DU 604 transmits, to the O-RU 602, a C-plane message for U-plane data of slot #n+1 (operation 620), and then the O-DU 604 transmits, to the O-RU 602, IQ data for each OFDM symbol of slot #n+1 by using a U-plane message (operations 630, 632, and 634).

FIG. 6 illustrates a case of DL transmission, but UL transmission can be performed in a similar way to the DL transmission. Specifically, the O-DU transmits the C-plane message, and the O-RU having received the C-plane message transmits, to the O-DU, IQ data for each symbol of the corresponding slot by using the U-plane message.

In the disclosure, a transmission method of a multi-user MIMO system including channel feedback is proposed, and an interface required for the O-RAN standard is defined to implement the technology.

To this end, the zero-forcing (ZF)-based MIMO transmission method of the related art supported by the O-RAN and an interface between the DU and the RU are briefly described below.

In a case where, in order to describe the ZF-based MIMO transmission method, Nt indicates the number of transmission-end antennas and Nr,k indicates the number of reception-end antennas for each reception user, the transmission end may identify, through channel feedback, information relating to channel matrix H of $\Sigma_{k=1}^{K} N_{r,k} \times N_t (\Sigma_{k=1}^{K} N_{r,k} \leq N_t$ is assumed) with respect to K number of users. In this case, a ZF weight generated by the transmission end is obtained according to Equation 1 below.

$$W_{ZF} = H^H (HH^H)^{-1} \qquad \text{Equation 1}$$

For convenience in expanding the equation, when the transmission end transmits $L(=\Sigma_{k=1}^{K} N_{r,k})$ number of pieces of data $x=(x_1, x_2, \ldots, x_L)^T$, $y=HW_{ZF}x=x$, and thus channel interference between all antennas can be prevented.

In the O-RAN, a format of control information transmitted from the DU to the RU through a C-plane interface is defined, wherein information related to the ZF MIMO transmission is defined in section type 5 or section type 6. Section type 5 includes an interface required for the DU to perform scheduling with reference to channel information and transfer scheduling information including a user index scheduled for the RU. Here, the DU may obtain channel information in two ways. First, the RU processes a sounding reference signal (SRS) and transmits channel information to the DU. Second, the DU processes the SRS and obtains the channel information. In the second case, the DU may transfer channel information to the RU, and an interface required in this case is included in section type 6.

FIG. 7 illustrates a section type-5 C-plane message format according to an embodiment of the disclosure.

Referring to FIG. 7, a section-type 5 (sectionType=5) message format 700 is used to transfer UE scheduling information so that the RU can calculate a beamforming weight in real time, and may include information fields.

A transport header may correspond to information according to the eCPRI header shown in FIG. 5 or IEEE-1914.3. The dataDirection 702 indicates the direction of a U-plane message, wherein 0 indicates the UL and 1 indicates the DL.

The filterIndex 704 indicates a channel filter of the RU and may be configured to be 0x1. The frameId 706 indicates a 10 ms unit particular frame. The SubframeId 708 indicates a 1 ms unit particular subframe in the corresponding frame. The slotId 710 indicates a particular slot in the corresponding frame.

The numberOfsections 714 indicates the number of sections indicated by the corresponding message. In a case of SectionType 716, one C-plane message can have only one section type. The udCompHdr 718 indicates the IQ bit width (bit) and a compression method for IQ data of all sections of the corresponding message. Specifically, the upper 4 bits indicate the iqWidth by 1 to 16 bits, and the lower 4 bits correspond to the compMeth indicating a compression method.

The section-type 5 C-plane message includes information relating to a predetermined section. The SectionID 722 indicates a section ID which can be used for matching between the C-plane message and the U-plane message. The rb 724 indicates a PRB to be used, wherein 0 indicates that all PRBs are used, and 1 indicates that every other PRB is used. The StartPrbc 726 is used to indicate the first PRB in the corresponding section, and the numPrbc 728 is used to indicate the number of PRBs in the corresponding section. The reMask 730 is a bit pattern indicating an RE (or a subcarrier) corresponding to a particular beam in the corresponding PRB, and different beams may be applied to one PRB through the reMask. The numSymbol 732 indicates the number of symbols corresponding to the section, and the extension flag (ef) 734 indicates whether there is a section extension at the end of the corresponding section. In addition, the C-plane message may include a section extension, and whether to include the section extension may be indicated by the ef 734. Each field or the content of the information described above in association with FIG. 7 does not necessarily include all fields, and some fields can be omitted and/or other fields may be added to perform the disclosure.

The above-described section-type 5 (ST5) frame is defined to transfer one ueID within a predetermined resource (indicated by the startPrbc, numPrbc, symInc, etc.), the corresponding layer information may be configured with an extended antenna carrier (eAxC) value in the transport header. The ueID is a parameter indicating a label of the UE to which the content of the corresponding section is applied, and can be used to support channel information transmitted from the O-DU to the O-RU. The ueID functions only as a label of the UE, and a particular value has no particular meaning in association with the UE type supported in the system. For ZF MIMO transmission, multiple ueIDs are to be allocated for the same resource, and there are two schemes to be considered therefor. The first scheme is to configure different eAxC values in the transport header and transfer the ST5 frame multiple times so as to transfer as many pieces of ueID information as the number of frames. The second scheme is to utilize a section extension (SE). For example, after the extension flag (ef) value shown in FIG. 7 is configured to be 1, a section extension frame can be added and multiple pieces of ueID information can be configured and transferred at once. Various types of section extensions may be supported for the purposes of transferring beamforming weights, transferring a beamforming attributes, transferring precoding configuration or parameters, transferring parameters related to modulation compression, transferring information relating to inconsecutive PRB allocation, or having multiple destinations of eAxCs (which indicates a digital baseband user-plane required for reception or transmission of one carrier in one independent antenna element, and may mean transmission with respect to each layer). However, section extension type 10 (SE10) is described in FIG. 8.

Figure 8:
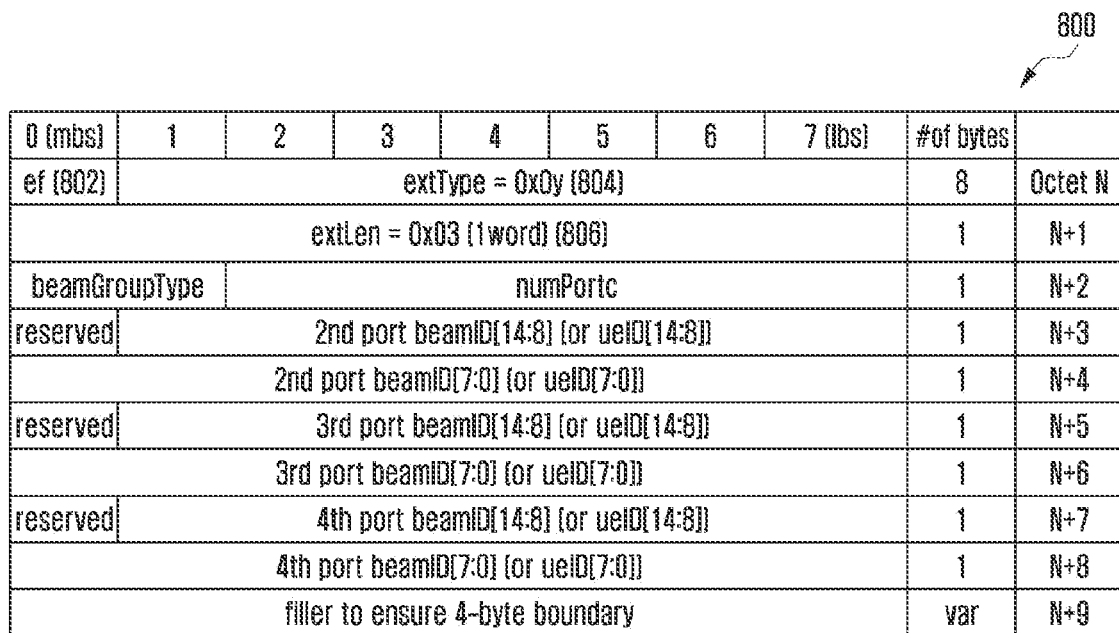
FIG. 8 illustrates a section extension type-10 message format according to an embodiment of the disclosure.

FIG. 8 illustrates a section extension type-10 message format according to an embodiment of the disclosure.

Referring to FIG. 8, a section extension 800 may include the following fields. The ef 802 indicates whether another section extension is sequentially included, and the extType 804 indicates the type of the section extension. Referring to FIG. 8, it illustrates, as an example, extType=0x0y, which indicates SE10. In this case, the beamGroupType is 10b. The exLen 806 may indicate a 4-byte unit length of the corresponding section extension. A numPortc value indicates the total number of ueIDs allocated to the SE, and pieces of ueID information may be consecutively configured as shown in FIG. 8. Each field or the content of the information described above in association with FIG. 8 does not necessarily include all fields, and some fields can be omitted and/or other fields may be added to perform the disclosure.

FIG. 9 illustrates a section type-6 C-plane message format according to an embodiment of the disclosure.

Referring to FIG. 9, a section type-6 (sectionType=6) message format 900 is used to periodically transfer UE channel information so that the RU can calculate the beamforming weight in real time, and may include information fields. A transport header may correspond to information according to the eCPRI header shown in FIG. 5 or IEEE-1914.3. The dataDirection 902 indicates the direction of a U-plane message, wherein 0 indicates the UL and 1 indicates the DL. Section type 6 is used to transfer a complex number channel value for all RBs and antennas with respect to the corresponding ueID, wherein the complex number channel value may be a ciISample/ciQSample channel information I value or Q value. Other parameters may correspond to the contents described in section type 5 with reference to FIG. 7. Each field or the content of the information described above in association with FIG. 9 does not necessarily include all fields, and some fields can be omitted and/or other fields may be added to perform the disclosure.

In recent cellular communication, when beamforming is applied in a single-user (SU)/multi-user (MU)-MIMO according to uplink transmit antenna selection (TAS) standardization, feasibility of technology enabling multi-stream transmission as well as single stream transmission for each user is increased. The above-mentioned ZF beamforming technique is a simpler way but a performance loss may occur since not only a channel of another user but also channel interference of one user is prevented. In order to prevent the loss, subspace decomposition or channelization of a channel matrix can be considered, but a new interface is required for the O-RAN standard to implement the technology.

The disclosure relates to a beamforming technique for reducing multi-user interference or co-channel interference (between layers) of a single user through channel decomposition and conversion by using a channel estimated using TAS in a communication physical layer. Specifically, the disclosure proposes an interface between a DU and an RU, which is required for actual implementation of the technique.

First, in SU-MIMO transmission, an appropriate weight can be generated through subspace decomposition or channelization of the corresponding user channel matrix. When the number of layers for SU transmission is L, $W_{SU}$ has a $N_t \times L$ dimension.

Next, in MU-MIMO transmission, the ZF weight generation scheme is used for preventing interference between multi-users, but in order to obtain a combining gain in each user, a channel transform may be performed in a form of $H_k' = X_k \cdot H_k$. Here, $H_k$ indicates each user channel of $N_{r,k} \times N_t$, $X_k$ indicates a channel transform matrix of $L_k \times N_{r,k}$ and corresponds to a unitary matrix, and $L_k$ indicates the number of transmission layers each user.

The disclosure proposes an interface for transferring information related to $W_{SU}$ and $X_k$, wherein a scheme of defining an interface for each of a case in which $W_{SU}$ and $X_k$ are generated by the DU and a case in which $W_{SU}$ and $X_k$ are generated by the RU.

(1) A case in which $W_{SU}$ and $X_k$ are generated by the RU

When $W_{SU}$ and $X_k$ are generated by the RU, the DU may transfer required scheduling information to the RU so that the RU can generate $W_{SU}$ and $X_k$. The scheduling information transferred to the RU by the DU may be transferred through the section type-5 C-plane message described above with reference to FIG. 7. In order for the RU to generate $W_{SU}$ and $X_k$, H or $H_k$ corresponding to each user channel is to be identified. However, in the current O-RAN standard, information relating to a user channel to which each ueID belongs is not transferred when the ueID is transferred. In the disclosure, an interface for transmitting, to the RU by the DU, information relating to the number of transmission layers of each user and information relating to a ueID group (that is, information for grouping ueIDs corresponding to a user) corresponding to each user channel, is proposed.

The first scheme of transferring ueID group information corresponding to each user channel and information on the number of transmission layers of each user is to add a new section extension (SE) to each ST5 frame and transfer the corresponding user information, and is described below with reference to FIG. 10.

Figure 10:
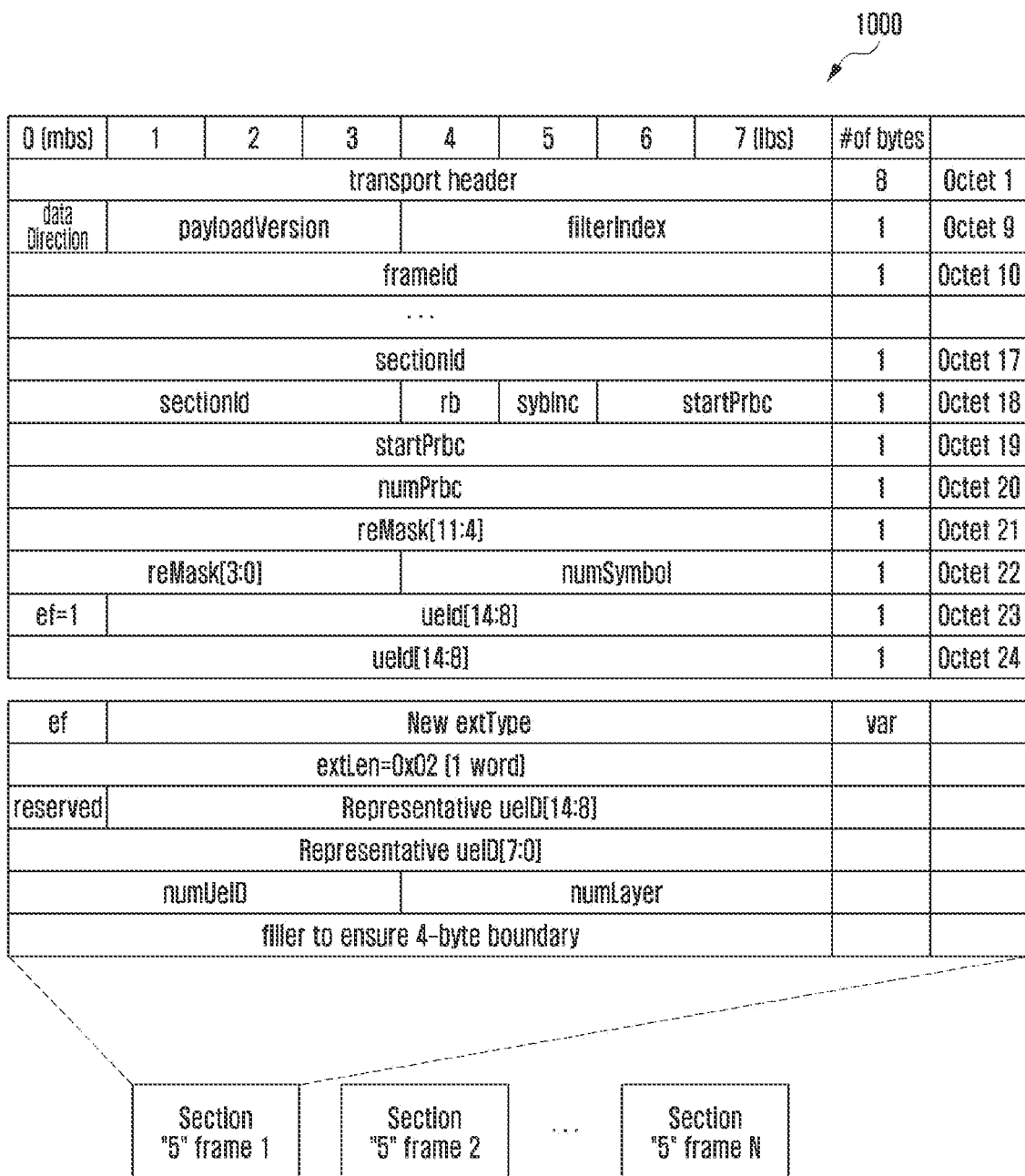
FIG. 10 illustrates a first operation of a message format for transferring scheduling information according to an embodiment of the disclosure.

FIG. 10 illustrates a first operation of a message format for transferring scheduling information according to an embodiment of the disclosure.

Referring to FIG. 10, the first operation 1000 illustrates a scheme of transferring user information by adding a new section extension (SE) to each ST5 frame corresponding to each ueID. The first scheme is a scheme of showing a user to which the ueID of each section frame belongs, wherein a virtual user ID can be defined and used, or a ueID representing each user (referred to as a representative ueID) as shown in FIG. 10 can be used as a user ID. The numUeID refers to the number of ueIDs corresponding to each user, and the numLayers refers to the number of transmission layers of each user. A total user number, a SU/MU operation differentiation flag, and the like can be added for other special purposes.

The second scheme of transferring ueID group information corresponding to each user channel and information on the number of transmission layers of each user is a scheme of transferring additional information (the number of layers allocated a user, etc.) and ueID information corresponding to all scheduled users through a section extension (SE) to one ST5 frame, and is described with reference to FIGS. 11, 15A, and 15B. For the SE used for the second scheme, a new extension type can be defined and used, or the existing extension type (for example, SE10) can be used.

FIG. 11 illustrates a second operation of a message format for transferring scheduling information according to an embodiment of the disclosure.

Referring to FIG. 11, the second operation 1100 illustrates a scheme of transferring ueID group information and additional information by using a new extension type. The numUser refers to a total number of users allocated to the corresponding extension, the numUeID refers to the number of ueIDs corresponding to each user, and the numLayers refers to the number of transmission layers of each user. In the extension type defined in FIG. 11, the numUeID number of ueIDs can be consecutively configured for each user. Similar to the case in FIG. 10, a total user number, a SU/MU operation differentiation flag, and the like can be added for other special purposes.

Figure 14:
FIG. 14 illustrates a fifth operation of a message format for transferring scheduling information according to an embodiment of the disclosure.

FIGS. 12, 13, and 14 illustrates an operation of expanding a field by using the existing SE10 and the existing beamGroupType=10b or a new beamGroupType. In this case, whether an extension field exists may be identified by an advBeamFlag value in the existing extension area.

FIG. 12 illustrates a third operation of a message format for transferring scheduling information according to an embodiment of the disclosure.

Referring to FIG. 12, in the third operation 1200, the existing SE10 can be used, and the numPortc can be defined as a value related to the number of users. Specifically, when advBeamFlag=1, a value of (a total user number—1) is used as the numPortc value in the existing area, and a representative ueID value of each user may be allocated to the existing area. In an extension field, a representative ueID of each user and numUeID and numLayer information relating to each user may be given and the remaining (numUeID—1) number of pieces of ueID information may be configured. In a case of SU transmission, a numPortc value becomes 0, and this is the case that is not considered in the existing beamGroupType=10b. Accordingly, in a case in which the existing beamGroupType=10b is used without change, when the numPortc value is 0, a new operation for referring to information of the extension field can be defined. Alternatively, a new beamGroupType can be defined and used.

FIG. 13 illustrates a fourth operation of a message format for transferring scheduling information according to an embodiment of the disclosure.

Referring to FIG. 13, in the fourth operation 1300, the existing SE10 can be used, and the numPortc can be defined as a value related the total number of scheduling layers. Specifically, when advBeamFlag=1, a value of (the total number of scheduling layers—1) is used as the numPortc value in the existing area, and as many ueIDs as the number of layers of each user can be allocated to the existing extension area. In addition, an extension field is similar to that of the third operation 1200 (FIG. 12), but only a ueID not configured in the existing area can be allocated at the time of ueID allocation in the fourth operation 1300.

FIG. 14 illustrates a fifth operation of a message format for transferring scheduling information according to an embodiment of the disclosure.

Referring to FIG. 14, in the fifth operation 1400, the existing SE10 can be used, and the numPortc can be defined as a total ueID number of all users. Specifically, when advBeamFlag=1, a value of (a total user number—1) is used as the numPortc value in the existing area, and all corresponding ueID information can be allocated to the existing area. In addition, only a representative ueID and information on the numUeId and the numLayer can be allocated to the extension field. However, since a numPortc value may exceed 64, a new beamGroupType other than the existing beamGroupType=10b can be defined.

It is illustrated in the third to fifth operations that the existing SE10 is used and whether an extension field exists is identified through an advBeamFlag value, but the format of the extension field described with reference to FIGS. 12 to 14 may be also defined as a new extension type in a similar way to the second operation 1100. In this case, the new extension type may be identified not through the advBeamFlag value but through an ef value, and an ef value, an extType value, an extLen value, and the like may be additionally included in a similar way to the first operation 1000.

Figure 15A:
FIG. 15A illustrates a sixth operation of a message format for transferring scheduling information according to an embodiment of the disclosure.

FIG. 15A illustrates a sixth operation of a message format for transferring scheduling information according to an embodiment of the disclosure.

Referring to FIG. 15A, when there are consecutive ueID values within one user, it is sufficient to transfer a single representative ueID value, a numUeID value, and a numLayer value. The sixth operation 1500 illustrated in FIG. 15A is an example illustrating FIG. 13 in an efficient format on the assumption of consecutive ueIDs within one user, and an example illustrating a new extension by using an ef value instead of the advBeamFlag value. In the case of the sixth operation 1500, when the numPortc number of ueID values are allocated to the existing SE10 area, it is assumed that all ueID values of the same user are configured with a single ueID value. Thereafter, the total user number can be identified through the number of different representative ueID values, and the number of transmission layers of each user can be identified through the same representative ueID value number. Accordingly, it is sufficient to transfer only a numUeID number of users to the new extension. Referring to FIG. 15A, it is illustrated that the numUeID has 4 bits, but the size thereof can be configured with various values.

FIG. 15B illustrates a message format for transferring scheduling information according to an embodiment of the disclosure.

Referring to FIG. 15B, it is assumed that the total scheduled user number is 2, and the maximum number of ueIDs to be allocated to one user is 8. Accordingly, ueID values allocated to users may be consecutive values and have as many values as the number of ueIDs allocated starting from a multiple of 8. For two users described in the above assumption, it is assumed that the number of transmission layers of the first user is 2, and ueIDs allocated to the first user are four consecutive values, that is, 0, 1, 2, and 3. The number of transmission layers of the second user is 3, and ueIDs allocated to the second user are eight consecutive values, that is, 8, 9, 10, . . . , 15. In addition, it is assumed that a representative ueID for each user is a multiple of 8, and the smallest value among the ueIDs allocated to the users, which is 0 in the case of the first user, is 8 in the case of the second user. The specific situations or numeral values described in the above assumption are examples only, and may be configured in various ways as required.

Referring to FIG. 15B, it shows a specific parameter configuration of a message format for efficiently transferring a total user number, the number of transmission layers of each user, and a ueID allocated to each user according to the sixth operation 1500 of the disclosure.

Referring to FIG. 15B, an SE10 area (extType=0x0y) may include ueIDs value corresponding to 0, 8, 8, and 8. In this case, although not shown, ST5 to which the section extension (SE10) is applied also includes one ueID value, wherein ST5 may include ueID=0 corresponding to the first user. Accordingly, five ueID values (0, 0, 8, 8, and 8) can be transferred. In addition, a new SE area (a new extType) may include the number of ueIDs allocated to the first user (numueID of 1st user=4) and the number of ueIDs allocated to the second user (numueID of 2nd user=8).

A method of obtaining, by the RU having received the message format illustrated in FIG. 15B, information relating to the total user number, the number of transmission layers of each user, and the ueID allocated to each user is as follows.

As described with reference to FIG. 15A above, the number of different representative ueIDs (that is, 0 and 8) in the illustrated message format indicates a total user number. For example, the RU may identify that the total scheduled user number in the example of FIG. 15B is 2. In addition, the number of times (that is, two times in the case of ueID=0, two times in the case of ueID=0, and three times in the case of ueID=8) by which the same representative ueID value is repeatedly configured indicates the number of transmission layers of each user. For example, in the example of FIG. 15B, the RU may identify that the number of transmission layers of the first user is 2, and the number of transmission layers of the second user is 3. In addition, a new SE area (a new extType) indicates that the number of ueIDs allocated to the first user is 4, and the number of ueIDs allocated to the second user is 8. Since it is assumed above that consecutive ueIDs are allocated to each user, in the example of FIG. 15B, the RU may identify that four consecutive ueIDs starting from a representative ueID value (ueID=0), that is, ueID=0, 1, 2, and 3 are allocated to the first user, and may identify that eight consecutive ueIDs starting from a representative ueID value (ueID=8), that is ueID=8, 9, 10, . . . , 15 are allocated to the second user.

According to the sixth operation 1500 described with reference to FIGS. 15A and 15B, unlike other examples, transmission efficiency can be increased by performing implicit transmission without including an explicit parameter indicating the total user number and the number of transmission layers of each user, by using a method of assuming the consecutive ueIDs and configuring ueIDs in a way different from the way. In addition, transmission efficiency can be increased by performing implicit transmission through the representative ueID of each user and the number of ueIDs allocated to each user without explicitly including all ueID values allocated to each user. The RU may receive message format information according the FIGS. 15A and 15B, configure a channel matrix (by utilizing ueID=0, 1, 2, and 3) of $4 \times N_t$ for the first user, and configure a channel matrix (by utilizing ueID=8, 9, . . . , 15) of $8 \times N_t$ for the second user. When each user channel matrix is configured, an appropriate weight can be generated by applying channel subspace decomposition, transmission efficiency of each user can be enhanced in comparison with that of the ZF-based transmission.

(2) A Case in which $W_{SU}$ and $X_k$ are Generated by the DU

When SU and $X_k$ are generated by the DU, an interface for additionally transferring $W_{SU}$ or $X_k$, other than an interface for transmitting additional information and ueID group information described above with reference to FIGS. 10 to 15B, is required.

Figure 16:
FIG. 16 illustrates a message format for transferring a weight or a channel transform matrix according to an embodiment of the disclosure.

FIG. 16 illustrates a message format for transferring a weight or a channel transform matrix according to an embodiment of the disclosure.

Referring to FIG. 16, it illustrates a format 1600 transmitting $W_{SU}$ or $X_k$ through a new SE. Other parameters except for the zISample/zQSample and the numAnt are the same as those in the previous definition. The meaning of the numAnt and the zSample value change according to a weight flag (wf), wherein in the case of SU transmission, the numAnt refers to a transmission antenna number, and the zSample value is a $W_{SU}$ of $N_t \times L$. In the case of MU transmission, the numAnt refers to a reception antenna number of each user, and zSample value is $X_k$ of $L_k \times N_{r,k}$. Here, the zSample value is transmitted with respect to all RB ranges configured by ST5. FIG. 16 is an example of supporting $W_{SU}$ and $X_k$ as one format, but $W_{SU}$ and $X_k$ may be supported as two different formats.

Figure 17:
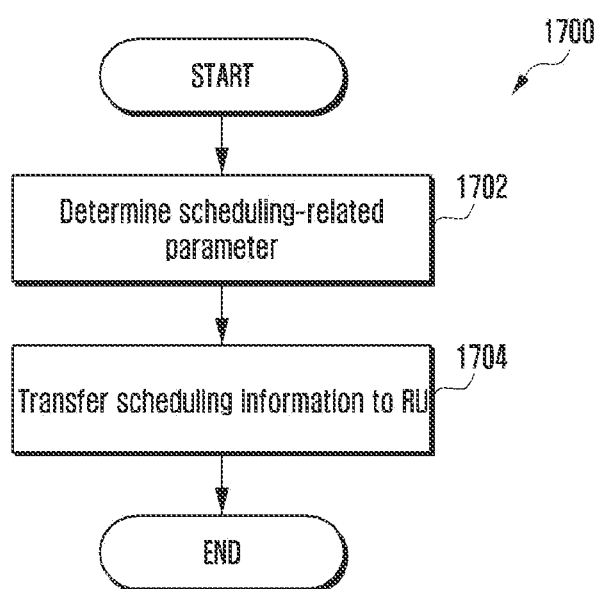
FIG. 17 is a flowchart illustrating an operation of a DU according to an embodiment of the disclosure.

FIG. 17 is a flowchart illustrating an operation 1700 of a digital unit (DU) according to an embodiment of the disclosure.

Referring to FIG. 17, in operation 1702, the DU may determine a scheduling-related parameter for at least one user. The scheduling-related parameter may include at least one of at least one user equipment identifier (ueID) corresponding to each user and the number of ueIDs corresponding to each user. In addition, in relation to scheduling information, the number of users to be scheduled and the transmission layer number of each user may be explicitly or implicitly determined according to the above-described embodiments. The scheduling-related parameter is a mere example, does not limit the scope of the disclosure, and may include a predetermined parameter required for transferring scheduling information to a radio unit (RU) by the DU.

In operation 1704, the DU may transmit scheduling information including the scheduling-related parameter to the RU. According to an embodiment of the disclosure, the scheduling information may include a first section extension field including information relating to a ueID related to the at least one user and a second section extension field including information relating to the number of ueIDs corresponding to each user. According to an embodiment of the disclosure, the first section extension field may repeatedly include as many identical ueIDs as the number of layers of each user, for each of the at least one user. According to an embodiment of the disclosure, the first section extension field may include as many different ueIDs as the number of the at least one user to be scheduled through the scheduling information. According to an embodiment of the disclosure, at least one ueID corresponding to each user may have as many consecutive values as the number of ueIDs corresponding to each user.

Figure 18:
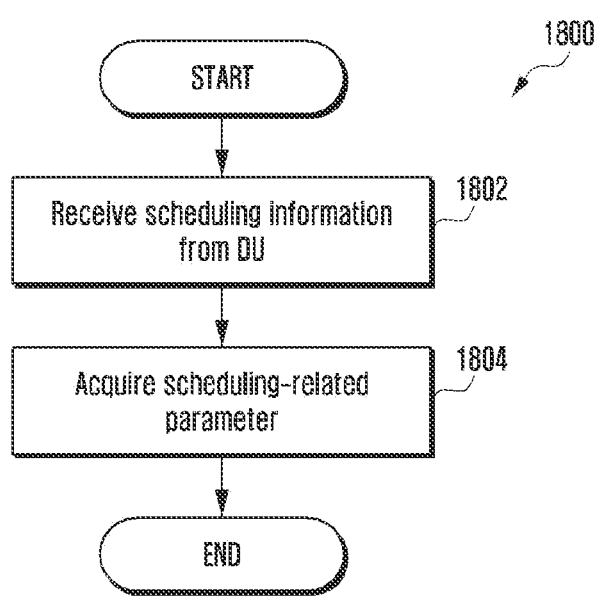
FIG. 18 is a flowchart illustrating an operation of an RU according to an embodiment of the disclosure.

FIG. 18 is a flowchart illustrating an operation 1800 of a radio unit (RU) according to an embodiment of the disclosure.

Referring to FIG. 18, in operation 1802, the RU may receive, from a digital unit (DU), scheduling information including a scheduling-related parameter for at least one user. According to an embodiment of the disclosure, the scheduling information may include a first section extension field including information relating to user equipment identifier (ueID) related to the at least one user and a second section extension field including information relating to the number of ueIDs corresponding to each user. According to an embodiment of the disclosure, the first section extension field may repeatedly include as many identical ueIDs as the number of layers of each user, for each of the at least one user. According to an embodiment of the disclosure, the first section extension field may include as many different ueIDs as the number of the at least one user to be scheduled through the scheduling information. According to an embodiment of the disclosure, at least one ueID corresponding to each user may have as many consecutive values as the number of ueIDs corresponding to each user.

In operation 1804, the RU may obtain the scheduling-related parameter by using the scheduling information. The scheduling-related parameter may include at least one of at least one ueID corresponding to each user and the number of ueIDs corresponding to each user. In addition, in relation to the scheduling information, the number of users to be scheduled and the layer of each user may be explicitly or implicitly determined according to the above-described embodiments. The scheduling-related parameter is a mere example, does not limit the scope of the disclosure, and may include a predetermined parameter required for transferring scheduling information to a radio unit (RU) by the DU.

Figure 19:
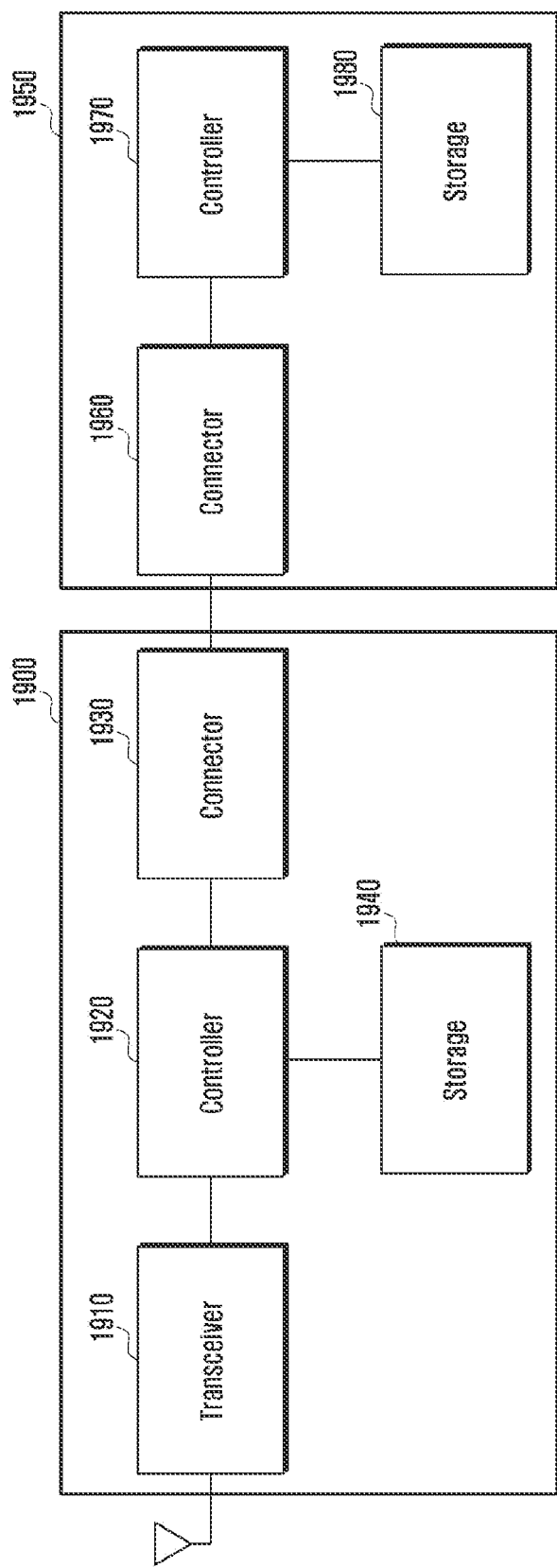
FIG. 19 illustrates a structure of a DU and an RU according to an embodiment of the disclosure.

FIG. 19 illustrates a structure of a DU and an RU according to an embodiment of the disclosure.

Referring to FIG. 19, an RU device 1900 of a base station may include a transceiver 1910, a controller 1920, a connector 1930, and a storage 1940. However, components of the RU device 1900 of the base station are not limited to the above-described example, and, for example, the RU device 1900 of the base station may include more or fewer components than the illustrated elements. In addition, the transceiver 1910, the storage 1940, the controller 1920, and the like may be implemented in a form of a single chip.

The transceiver 1910 may transmit or receive a signal to or from the terminal. Here, the signal may include control information and data. To this end, the transceiver 1910 may include an RF transmitter configured to up-convert and amplify the frequency of a transmitted signal, and an RF receiver configured to low-noise amplify a received signal and to down-convert the frequency. However, this is a mere embodiment of the transceiver 1910, and components of the transceiver 1910 are not limited to the RF transmitter and the RF receiver. In addition, the transceiver 1910 may receive a signal through a radio channel, output the signal to the controller 1920, and transmit the signal output from the controller 1920, through the radio channel. In addition, the transceiver 1910 may separately have an RF transceiver for an LTE system and an RF transceiver for an NR system, or one transceiver may perform physical-layer processing of the LTE and NR.

The storage 1940 may store a program and data required for operation of the RU device of the base station. In addition, the storage 1940 may store control information or data included in a signal transmitted or received by the RU device of the base station. The storage 1940 may include a storage medium, such as read only memory (ROM), random access memory (RAM), a hard disk, a compact disc-ROM (CD-ROM), and a digital versatile disc (DVD), or a combination of storage media. Furthermore, there may be multiple storages 1940.

The controller 1920 may control a series of processes enabling the RU device 1900 of the base station to operate according to the above-described embodiment of the disclosure. For example, the controller 1920 may transmit or receive an LTE or an NR signal to or from the terminal according to a C-plane message and a U-plane message received from the DU device 1950 of the base station through the connector 1930. There may be multiple controllers 1920, and the controller 1920 may execute a program stored in the storage 1940 to perform a component control operation by the RU device 1900 of the base station.

The connector 1930 is a device configured to connect the RU device 1900 of the base station to the DU device 1950 of the base station, and may perform physical-layer processing for message transmission or reception, and perform an operation of transmitting a message to the DU device 1950 of the base station and receiving a message from the DU device 1950 of the base station.

The DU device 1950 of the base station includes a controller 1970, a connector 1960, and a storage 1980. However, components of the DU device 1950 of the base station are not limited to the above-described example, and, for example, the DU device 1950 of the base station may include more or fewer components than the illustrated components. In addition, the connector 1960, the storage 1980, the controller 1970, and the like may be implemented in a form of a single chip.

The controller 1970 may control a series of processes enabling the DU device 1950 of the base station to operate according to the above-described embodiment of the disclosure. For example, the controller 1970 may generate a C-plane message and a U-plane message to be transmitted to the RU device 1900 of the base station to transmit the messages to the RU device 1900 of the base station through the connector 1960. There may be multiple controllers 1970, and the controller 1970 may execute a program stored in the storage 1980 to perform a component control operation by the DU device 1950 of the base station.

The storage 1980 may store a program and data required for operation of the DU device of the base station. In addition, the storage 1980 may store control information or data included in a signal transmitted or received by the DU device of the base station. The storage 1980 may include a storage medium, such as ROM, RAM, a hard disk, a CD-ROM, and a DVD, or a combination of storage media. Furthermore, there may be multiple storages 1980.

The connector 1960 is a device configured to connect the RU device 1900 of the base station to the DU device 1950 of the base station, and may perform physical-layer processing for message transmission or reception, and perform an operation of transmitting a message to the RU device 1900 of the base station and receiving a message from the RU device 1900 of the base station.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a distributed unit (DU) of a base station, the method comprising:
   determining scheduling-related parameters for users by identifying one or more user equipment identifiers (ueIDs) corresponding to each of the users and a number of ueIDs corresponding to each of the users; and
   transmitting, to a radio unit (RU), scheduling information including the scheduling-related parameters,
   wherein the scheduling information comprises:
      a first section extension field comprising information relating to the one or more ueIDs corresponding to each of the users, and
      a second section extension field comprising information relating to the number of ueIDs corresponding to each of the users, and
   wherein the first section extension field comprises as many different ueIDs as the number of the users to be scheduled through the scheduling information.

2. The method of claim 1, wherein the one or more ueIDs corresponding to each of the users have as many consecutive values as the number of ueIDs corresponding to each of the users.

3. The method of claim 1, wherein the first section extension field provides a number of layers of each of the users.

4. The method of claim 3, wherein, for each of the users, the first section extension field comprises same ueID repeated as many times as the number of layers of each of the users.

5. A distributed unit (DU) device of a base station, the device comprising:
   a connector configured to transmit or receive a signal to or from a radio unit (RU); and
   at least one processor configured to:
      determine scheduling-related parameters for users by identifying one or more user equipment identifiers (ueIDs) corresponding to each of the users and a number of ueIDs corresponding to each of the users, and
      transmit, to the RU, scheduling information including the scheduling-related parameters,
   wherein the scheduling information comprises:
      a first section extension field comprising information relating to the one or more ueIDs corresponding to each of the users, and
      a second section extension field comprising information relating to the number of ueIDs corresponding to each of the users, and
   wherein the first section extension field comprises as many different ueIDs as the number of the users to be scheduled through the scheduling information.

6. The device of claim 5, wherein the one or more ueIDs corresponding to each of the users have as many consecutive values as the number of ueIDs corresponding to each of the users.

7. The device of claim 5, wherein the first section extension field provides a number of layers of each of the users.

8. The device of claim 7, wherein, for each of the users, the first section extension field comprises same ueID repeated as many times as the number of layers of each of the users.

9. A method of a radio unit (RU) of a base station, the method comprising:
   receiving, from a distributed unit (DU), scheduling information including scheduling-related parameters for users, wherein the scheduling-related parameters include one or more user equipment identifiers (ueIDs) corresponding to each of the users and a number of ueIDs corresponding to each of the users; and
   acquiring the scheduling-related parameters for the users based on the scheduling information,
   wherein the scheduling information comprises:
      a first section extension field comprising information relating to the one or more ueIDs corresponding to each of the users, and
      a second section extension field comprising information relating to the number of ueIDs corresponding to each of the users, and
   wherein the first section extension field comprises as many different ueIDs as the number of the users to be scheduled through the scheduling information.

10. The method of claim 9, wherein the one or more ueIDs corresponding to each of the users have as many consecutive values as the number of ueIDs corresponding to each of the users.

11. The method of claim 9, wherein the first section extension field provides a number of layers of each of the users.

12. The method of claim 11, wherein, for each of the users, the first section extension field comprises same ueID repeated as many times as the number of layers of each of the users.

13. A radio unit (RU) device of a base station, the device comprising:
- a connector configured to transmit or receive a signal to or from a distributed unit (DU); and
- at least one processor configured to:
  - receive, from the DU, scheduling information including scheduling-related parameters for users wherein the scheduling-related parameters include one or more user equipment identifiers (ueIDs) corresponding to each of the users and a number of ueIDs corresponding to each of the users, and
  - acquire the scheduling-related parameters for the users based on the scheduling information,
- wherein the scheduling information comprises:
  - a first section extension field comprising information relating to the one or more ueIDs corresponding to each of the users, and
  - a second section extension field comprising information relating to the number of ueIDs corresponding to each of the users, and
- wherein the first section extension field comprises as many different ueIDs as the number of the users to be scheduled through the scheduling information.

14. The device of claim 13, wherein the one or more ueIDs corresponding to each of the users have as many consecutive values as the number of ueIDs corresponding to each of the users.

15. The device of claim 13, wherein the first section extension field provides a number of layers of each of the users.

16. The device of claim 15, wherein, for each of the users, the first section extension field comprises same ueID repeated as many times as the number of layers of each of the users.

17. A method of a distributed unit (DU) of a base station, the method comprising:
- determining scheduling-related parameters for users by identifying one or more user equipment identifiers (ueIDs) corresponding to each of the users and a numUeID (number of ueIDs per user) corresponding to each of the users; and
- transmitting, to a radio unit (RU), scheduling information including the scheduling-related parameters,
- wherein the scheduling information comprises:
  - a first section extension field comprising information relating to the one or more ueIDs corresponding to each of the users, and
  - a second section extension field comprising information relating to the numUeID corresponding to each of the users, and
- wherein the first section extension field comprises as many different ueIDs as the number of the users to be scheduled through the scheduling information.

18. A distributed unit (DU) device of a base station, the device comprising:
- a connector configured to transmit or receive a signal to or from a radio unit (RU); and
- at least one processor configured to:
  - determine scheduling-related parameters for users by identifying one or more user equipment identifiers (ueIDs) corresponding to each of the users and a numUeID (number of ueIDs per user) corresponding to each of the users, and
  - transmit, to the RU, scheduling information including the scheduling-related parameter,
- wherein the scheduling information comprises:
  - a first section extension field comprising information relating to the one or more ueIDs corresponding to each of the users, and
  - a second section extension field comprising information relating to the numUeID corresponding to each of the users, and
- wherein the first section extension field comprises as many different ueIDs as the number of the users to be scheduled through the scheduling information.

19. A method of a radio unit (RU) of a base station, the method comprising:
- receiving, from a distributed unit (DU), scheduling information including scheduling-related parameters for users, wherein the scheduling-related parameters include one or more user equipment identifiers (ueIDs) corresponding to each of the users and a numUeID (number of ueIDs per user) corresponding to each of the users; and
- acquiring the scheduling-related parameters for the users based on the scheduling information,
- wherein the scheduling information comprises:
  - a first section extension field comprising information relating to the one or more ueIDs corresponding to each of the users, and
  - a second section extension field comprising information relating to the numUeID corresponding to each of the users, and
- wherein the first section extension field comprises as many different ueIDs as the number of the users to be scheduled through the scheduling information.

20. A radio unit (RU) device of a base station, the device comprising:
- a connector configured to transmit or receive a signal to or from a distributed unit (DU); and
- at least one processor configured to:
  - receive, from the DU, scheduling information including scheduling-related parameters for users wherein the scheduling-related parameters include one or more user equipment identifiers (ueIDs) corresponding to each of the users and a numUeID (number of ueIDs per user) corresponding to each of the users, and
  - acquire the scheduling-related parameters for the users based on the scheduling information,
- wherein the scheduling information comprises:
  - a first section extension field comprising information relating to the one or more ueIDs corresponding to each of the users, and
  - a second section extension field comprising information relating to the numUeID corresponding to each of the users, and
- wherein the first section extension field comprises as many different ueIDs as the number of the users to be scheduled through the scheduling information.

* * * * *